US012744420B2

(12) United States Patent
Geng et al.

(10) Patent No.: US 12,744,420 B2
(45) Date of Patent: Sep. 22, 2026

(54) AXIAL FLUX MOTOR ROTOR DRIVE MOTOR FOR ELECTRIC VEHICLE

(71) Applicants: Huawei Digital Power Technologies Co., Ltd., Shenzhen (CN); Nanjing University of Science and Technology, Nanjing (CN)

(72) Inventors: Weiwei Geng, Nanjing (CN); Chaoqiang Wu, Shenzhen (CN); Jinhua Chen, Dongguan (CN); Zhao Zhou, Dongguan (CN)

(73) Assignees: Huawei Digital Power Technologies Co., Ltd., Shenzhen (CN); Nanjing University of Science and Technology, Nanjing (CN)

( * ) Notice: Subject to any disclaimer, the term of this patent is extended or adjusted under 35 U.S.C. 154(b) by 262 days.

(21) Appl. No.: 18/521,906

(22) Filed: Nov. 28, 2023

(65) Prior Publication Data

US 2024/0097513 A1 Mar. 21, 2024

Related U.S. Application Data

(63) Continuation of application No. PCT/CN2021/097371, filed on May 31, 2021.

(51) Int. Cl.
*H02K 1/2798* (2022.01)
*H02K 1/18* (2006.01)
(Continued)

(52) U.S. Cl.
CPC ........... *H02K 1/2798* (2022.01); *H02K 1/182* (2013.01); *H02K 1/28* (2013.01); *H02K 1/30* (2013.01); *H02K 21/24* (2013.01)

(58) Field of Classification Search
CPC .... H02K 1/182; H02K 1/2793; H02K 1/2798; H02K 1/28; H02K 1/30; H02K 21/24
(Continued)

(56) References Cited

U.S. PATENT DOCUMENTS 1,140,155 A * 5/1915 Heins .................... H02K 23/46 310/152
1,678,001 A * 7/1928 Brace ....................... H01F 1/04 420/104

(Continued)

FOREIGN PATENT DOCUMENTS

CN 102570750 A 7/2012
CN 203289217 U 11/2013

(Continued)

*Primary Examiner* — Oluseye Iwarere
*Assistant Examiner* — Daniel K Schlak
(74) *Attorney, Agent, or Firm* — Leydig, Voit & Mayer, Ltd.

(57) ABSTRACT

A motor rotor, a drive motor, and an electric vehicle are provided. In the motor rotor, a rotor core with at least two protruding components is provided. At least two magnetic steels and at least two sheets are disposed in grooves between the at least two protruding components and then coupled to the rotor core with a rotor pressing plate. In addition, one SMC sheet is stacked on each of the magnetic steels, so that an eddy current loss of a permanent magnet can be effectively reduced. Each of the magnetic steels is disposed in a groove between protruding components, and the SMC sheet is added, so that a saliency ratio is increased, a reluctance torque ratio is increased, and a quantity of magnetic steels for use is reduced.

20 Claims, 7 Drawing Sheets

(51) Int. Cl.
*H02K 1/28* (2006.01)
*H02K 1/30* (2006.01)
*H02K 21/24* (2006.01)

(58) Field of Classification Search
USPC ............................................ 310/156.32, 268
See application file for complete search history.

(56) References Cited

U.S. PATENT DOCUMENTS 2,383,969 A * 9/1945 Howerton ................. H01F 1/04 420/107
2,695,370 A * 11/1954 Brouwer ............... H01F 13/003 310/152
2004/0113505 A1* 6/2004 Haydock ................ H02K 15/03 310/156.19
2005/0179336 A1 8/2005 Hasebe et al.
2006/0284507 A1 12/2006 Murakami
2011/0006631 A1* 1/2011 Lamperth ............ H02K 1/2795 310/156.12
2011/0133596 A1* 6/2011 Asano .................... H02K 21/24 310/156.43
2011/0241460 A1 10/2011 Mebarki et al.
2017/0323713 A1 11/2017 Moeller et al.
2018/0198335 A1* 7/2018 Inoue ..................... H02K 16/02
2018/0323679 A1 11/2018 Woolmer
2019/0036402 A1* 1/2019 Tiegna ................. H02K 1/2796
2020/0251946 A1* 8/2020 Yao ...................... H02K 1/2798
2021/0351658 A1* 11/2021 Jore ....................... H02K 5/203
2022/0337112 A1* 10/2022 Vianello .................. H02K 1/30
2024/0154481 A1* 5/2024 Duhaut .................. H02K 15/50
2025/0141290 A1* 5/2025 Kim ......................... H02K 1/04
2025/0373131 A1* 12/2025 Tsai ..................... H02K 1/2798

FOREIGN PATENT DOCUMENTS

CN 207559710 U * 6/2018 ............... H02K 1/27
CN 108808921 A * 11/2018 ........... H02K 1/2793
CN 109245401 A * 1/2019 ........... H02K 5/1732
CN 208445371 U * 1/2019 ............... H02K 1/27
CN 109639003 A * 4/2019 ............... H02K 1/30
CN 109639004 A 4/2019
CN 110945751 A 3/2020
CN 111010008 A 4/2020
CN 111355323 A * 6/2020 ............... H02K 1/28
CN 210927238 U * 7/2020 ............... H02K 1/27
CN 111969821 A * 11/2020 ............. H02K 21/24
CN 112564442 A 3/2021
CN 112564443 A 3/2021
EP 3576253 A1 12/2019
GB 2494898 A 3/2013

* cited by examiner

AXIAL FLUX MOTOR ROTOR DRIVE MOTOR FOR ELECTRIC VEHICLE

CROSS-REFERENCE TO RELATED APPLICATIONS

This application is a continuation of International Application No. PCT/CN2021/097371, filed on May 31, 2021, the disclosure of which is hereby incorporated by reference in its entirety.

TECHNICAL FIELD

Embodiments of the present disclosure relate to the field of motor technologies, and in particular, to a motor rotor, a drive motor, and an electric vehicle.

BACKGROUND

Compared with a conventional radial flux permanent magnet machine, an axial flux permanent magnet machine (AFPMM) has obvious advantages of a more compact structure, a higher torque density, and high efficiency. In the conventional technology, in actual application, the axial flux permanent magnet machine does not rotate at a high speed, and has a structure that is mostly a surface-mounted structure. Therefore, for a structural strength of the axial flux permanent magnet machine, fixation of a magnetic steel and a rotor core with axial force is mainly considered. With miniaturization and an increasing rotation speed of a drive motor, a higher rotation speed of the axial flux permanent magnet machine poses a great challenge to a structural strength of a rotor, because there is large centrifugal force due to a large outer diameter of a rotor disk that moves at a high speed. In addition, with improvement of the rotor, a running frequency of the rotor also increases. As a result, there is obviously a greater eddy current loss of a conventional surface-mounted permanent magnet rotor structure, causing the rotor to heat up and have lower efficiency. Therefore, how to improve a structural strength of an axial flux motor and reduce a rotor loss to avoid some disadvantages of an existing surface-mounted axial flux permanent magnet machine currently becomes an urgent problem to be resolved for development of axial flux motor technologies and application thereof.

SUMMARY

To resolve the foregoing problem, embodiments of this application provide a motor rotor, a drive motor, and an electric vehicle. Magnetic steels are reinforced in an axial direction and a radial direction, to improve reliability of the rotor running at a high rotation speed. A rotor yoke structure is improved to improve a magnetic circuit structure for a greater saliency ratio, and a greater electromagnetic reluctance torque, so that a torque density is further improved. SMC sheets are added, so that a loss of the magnetic steels is reduced, and efficiency is higher, thereby reduce heat of the rotor.

Therefore, the following technical solution is used in embodiments of this application:

According to a first aspect, this application provides a motor rotor, including: one rotor core, where the rotor core includes one rotor yoke and at least two protruding components, and the at least two protruding components are disposed on a first surface of the rotor yoke; at least two grooves, where the groove is formed with two adjacent protruding components and the first surface of the rotor yoke; at least two magnetic steels that are separately disposed in the at least two grooves, where a quantity of the magnetic steels is the same as a quantity of the grooves; and one rotor pressing plate that is coupled to the at least two protruding components for fastening the at least two magnetic steels in the at least two grooves.

In this implementation, the rotor pressing plate is added to the protected motor rotor, and the rotor pressing plate is coupled to the rotor core to reinforce the magnetic steels in an axial direction, thereby improving reliability of the rotor in an axial direction. A structure of the rotor core is improved, and the plurality of protruding components are disposed on a surface of the rotor core. By improving a structure of the rotor yoke, a magnetic circuit structure is improved, so that a saliency ratio is increased, an electromagnetic reluctance torque is increased, and a torque density is increased.

In an implementation, the motor rotor further includes at least two sheets that are separately disposed in the at least two grooves, where one of the sheets is stacked on one of the magnetic steels, and a quantity of the sheets is the same as the quantity of the magnetic steels. The rotor pressing plate is further configured to fasten the at least two magnetic steels and the at least two sheets in the at least two grooves.

In this implementation, SMC sheets are added and attached to the magnetic steels, so that a loss of the magnetic steels is reduced, efficiency is improved, and heat of the rotor is reduced.

In an implementation, the at least two protruding components are disposed on the first surface of the rotor yoke at regular intervals along a circumferential direction.

In an implementation, the protruding components include a first component, a second component, and a third component, heights of the first component and the third component are the same, and heights of the first component and the second component are different, where the height is a length along a normal direction of the first surface of the rotor yoke, and the first component, the second component, and the third component are sequentially connected and disposed on the first surface of the rotor yoke.

In this implementation, the protruding components are designed into an inverted T-shaped structure. Shorter parts on two sides are for coupling to the rotor pressing plate, so that when the rotor core is coupled to the rotor pressing plate, a higher part in the middle of each of the protruding components, an upper surface of the rotor pressing plate, and an upper surface of the sheets are on a same horizontal plane, bringing a better whole look of the motor rotor.

In an implementation, a shape of the magnetic steel is the same as a shape of the groove.

In this implementation, the shape and a size of the magnetic steels generally need to match a groove between two protruding components on the first surface of the rotor yoke, to avoid an excessively large magnetic steel that cannot be disposed in the groove, or an excessively small magnetic steel that moves horizontally in the groove.

In an implementation, a shape of the sheet is the same as the shape of the groove.

In this implementation, the shape and a size of the sheets generally need to match a groove between two protruding components on the first surface of the rotor yoke, to avoid an excessively large sheet that cannot be disposed in the groove, or an excessively small sheet that moves horizontally in the groove.

In an implementation, the sheet is made of a soft magnetic composite material.

In this implementation, there is an effect that an eddy current loss of a motor can be reduced by taking advantage of features of the SMC such as magnetic conductivity and a low high-frequency loss.

In an implementation, the rotor pressing plate includes one pressing plate ring, at least two first radials, and at least two second radials, and a quantity of the first radials is the same as a quantity of the second radials, and is the same as a quantity of the protruding components; and the at least two first radials and the at least two second radials are disposed between each other, and one end of each of the at least two first radials and one end of each of the at least two second radials are fastened to the pressing plate ring, where a distance between a first radial and a second radial that are adjacent is equal to a distance between the first component and the third component.

In this implementation, the rotor pressing plate is designed into a gear structure, and each of the radials can be embedded into a lower part of each of the protruding components, so that the whole motor rotor is relatively not thick because the rotor pressing plate is not above a protruding part or on the upper surface of the sheets.

In an implementation, heights of the first radials and the second radials are the same as and equal to a difference between the heights of the first component and the second component.

In this implementation, a sum of a height of the radials and a height of the lower part on two sides of the protruding component is equal to a height of the higher part in the middle of the protruding component, so that when the rotor core is coupled to the rotor pressing plate, the higher part in the middle of each of the protruding components, the upper surface of the rotor pressing plate, and the upper surface of the sheets are on the same horizontal plane, bringing a better whole look of the motor rotor.

In an implementation, the first component and the third component each include at least one first fastening structure, and the first radial and the second radial each include at least one second fastening structure, where the at least two second fastening structures are coupled to the at least two first fastening structures in a one-to-one correspondence, to fasten the rotor pressing plate to the rotor core.

In this implementation, the plurality of fastening structures are disposed on the core yoke and the rotor pressing plate. The fastening structures on the core yoke are coupled to the fastening structures on the rotor pressing plate, so that the rotor pressing plate is fastened to the rotor core, thereby improving a structural strength of the motor rotor in the axial direction.

In an implementation, the motor rotor further includes a rotor support. The rotor support includes a support backing plate, a support outer ring, and a support inner ring, the support outer ring is disposed on an outer edge of the support backing plate, and the support inner ring is disposed at a central position of the support backing plate; and the rotor core is disposed in grooves between the support backing plate, the support outer ring, and the support inner ring.

In this implementation, by designing the rotor support into ring-shaped, disposing a support ring on an outer edge of the rotor support, and disposing another support ring at a central position of the rotor support, the rotor core is disposed on the rotor support, and the outer ring and the inner ring of the support are used as baffle plates, to prevent the magnetic steels and the sheets from falling off in a radial direction when the motor rotor rotates, thereby improving the structural strength of the motor rotor in the radial direction.

In an implementation, the support backing plate includes at least two third fastening structures. The at least two first fastening structures are coupled to the at least two third fastening structures in a one-to-one correspondence, to fasten the rotor core to the rotor support.

In this implementation, the plurality of fastening structures are disposed on the core yoke and the support backing plate. The fastening structures on the core yoke are coupled to the fastening structures on the support backing plate, so that the rotor core is fastened to the rotor support, thereby improving the structural strength of the motor rotor in the axial direction.

In an implementation, the pressing plate ring includes at least two fourth fastening structures, and the support inner ring includes at least two fifth fastening structures. The at least two fourth fastening structures are coupled to the at least two fifth fastening structures in a one-to-one correspondence, to fasten the rotor pressing plate to the rotor support.

In this implementation, the plurality of fastening structures are disposed on the pressing plate ring and the support inner ring. The fastening structures on the pressing plate ring are coupled to the fastening structures on the support inner ring, so that the rotor pressing plate is fastened to the rotor support, thereby improving the structural strength of the motor rotor in the axial direction.

In an implementation, the motor rotor further includes a core clamping ring that is disposed on an inner edge of a central through hole of the rotor yoke.

In this implementation, the core clamping ring is disposed between the support inner ring of the rotor support and the rotor core to ensure that there is no gap between the rotor support and the rotor core, so that a phenomenon that the rotor core shakes in the rotor support when the motor rotor rotates at a high speed is avoided.

In an implementation, the motor rotor further includes a sheath that is disposed on the outer edge of the rotor support.

In this implementation, the sheath is sleeved on an outer side of the rotor support to improve the strength of the motor rotor in the radial direction.

According to a second aspect, this application provides a drive motor, including at least one stator and a plurality of motor rotors according to the possible implementations of the first aspect, where every two of the motor rotors are disposed on two sides of one stator planar symmetrically.

According to a third aspect, this application provides an electric vehicle, including at least one drive motor according to the second aspect.

BRIEF DESCRIPTION OF DRAWINGS

The accompanying drawings that need to be used for describing embodiments or the conventional technology are described briefly below.

FIG. 4(*b*) is a schematic top view of a structure of a rotor core according to an embodiment of this application;

DESCRIPTION OF EMBODIMENTS

Technical solution in embodiments of this application is described below with reference to the accompanying drawings in embodiments of this application.

In descriptions of this application, locations or location relationships indicated by terms "center", "up", "down", "front", "behind", "left", "right", "vertical", "horizontal", "top", "bottom", "inner", "outer", and the like are based on locations or location relationships shown in the accompanying drawings, and are merely intended for ease of describing this application and simplifying descriptions, instead of indicating or implying that a mentioned apparatus or element needs to be provided on a specific location or constructed and operated on a specific location, and therefore shall not be understood as limitations on this application.

In the descriptions of this application, it should be noted that, unless otherwise clearly specified and limited, terms "mount", "link", and "connect" should be understood in a broad sense, for example, may mean a fixed connection, may be a detachable connection, or may be a butt joint connection or an integrated connection. A person of ordinary skill in the art can understand specific meanings of the foregoing terms in this application based on specific cases.

In the descriptions of this specification, specific features, structures, materials, or characteristics may be combined in a proper manner in any one or more of embodiments or examples.

Figure 1:
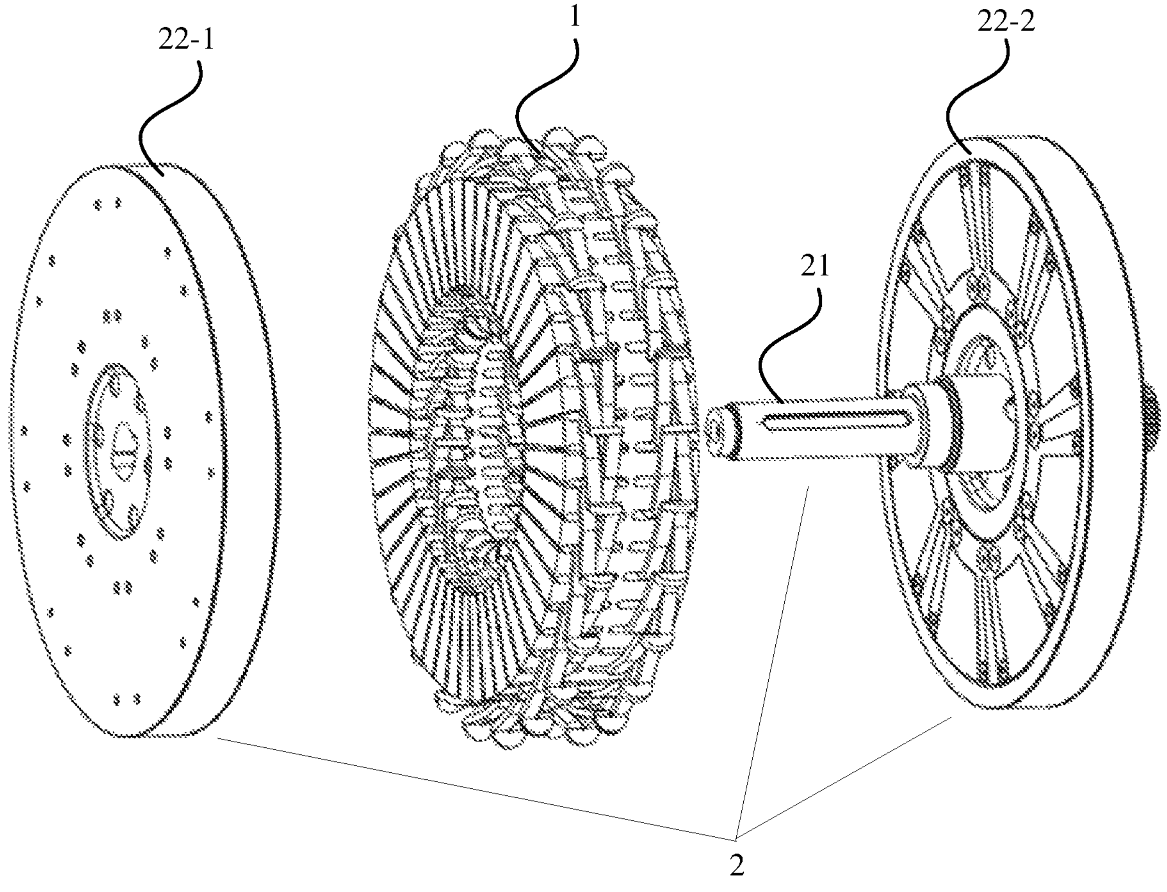
FIG. 1 is a schematic diagram of a structure of a drive motor according to an embodiment of this application.

FIG. 1 is a schematic diagram of a structure of a drive motor according to an embodiment of this application. As shown in FIG. 1, the drive motor includes a stator 1 and a rotor 2, and the rotor 2 is disposed inside the stator.

In the drive motor, the stator 1 generally includes at least one stator punching and an armature winding, and the at least one stator punching is stacked to form a ring. A groove is provided on each stator punching, and a plurality of stator slots are formed on rings formed with a plurality of stacked stator punchings, and are used to nest the armature winding, so that when the armature winding is powered on, an alternating flux is generated inside the stator 1.

The rotor 2 includes a rotating shaft 21 and two motor rotors (22-1 and 22-2). The motor rotor 22-1 and the motor rotor 22-2 are stacked planar symmetrically on two sides of the stator 1, and are nested on the rotating shaft 21. Magnetic steels are disposed inside the motor rotors 22, so that a permanent magnet flux is generated on the whole rotor 2. When an alternating current is input into the armature winding of the stator 1, the generated alternating flux interacts with the permanent magnet flux generated on the rotor 2, so that the rotor 2 rotates in the stator 1.

In FIG. 1 of this application, only one stator 1 and the two motor rotors 22 are used as an example. This does not mean that the technical solution of this application is limited to the solution in FIG. 1. For a person skilled in the art, quantities of stators 1 and motor rotors 22 of one drive motor are not limited to any specific quantity.

Figure 2:
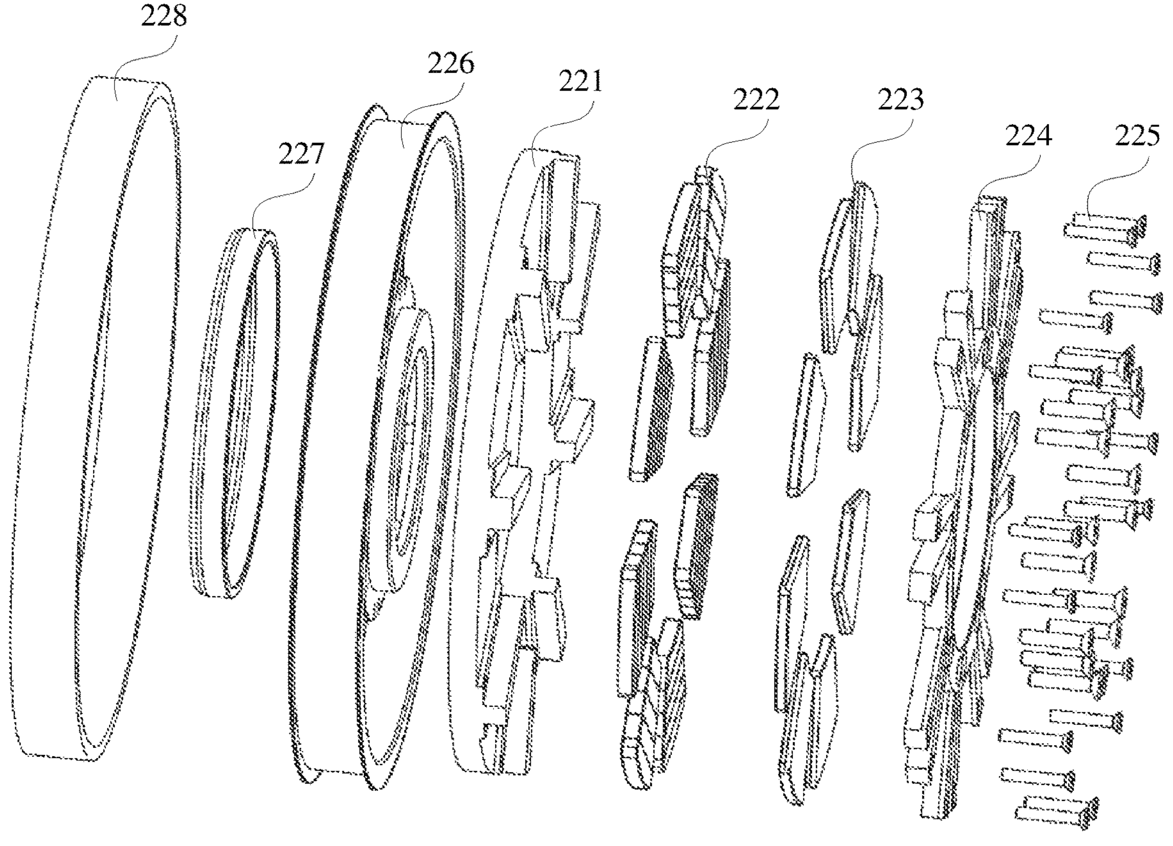
FIG. 2 is a schematic exploded diagram of a structure of a motor rotor according to an embodiment of this application.
Figure 3:
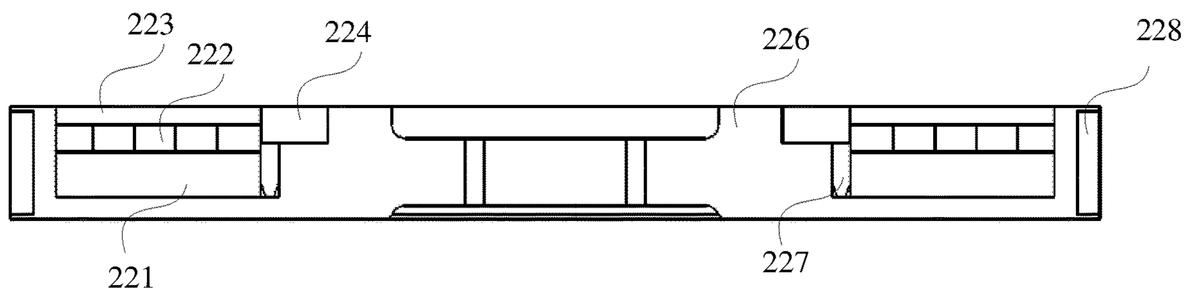
FIG. 3 is a schematic sectional diagram of a structure of a motor rotor according to an embodiment of this application.

FIG. 2 and FIG. 3 are schematic diagrams of a structure of a motor rotor. As shown in the figures, the motor rotor 22 mainly includes a rotor core 221, a plurality of magnetic steels 222, a plurality of sheets 223, a rotor pressing plate 224, and a plurality of fastening components 225. The plurality of magnetic steels 222 and the plurality of sheets 223 are fastened, by using the plurality of fastening components 225, in grooves between the rotor core 221 and the rotor pressing plate 224, to form the motor rotor 22. Details are provided below.

Figure 4A:
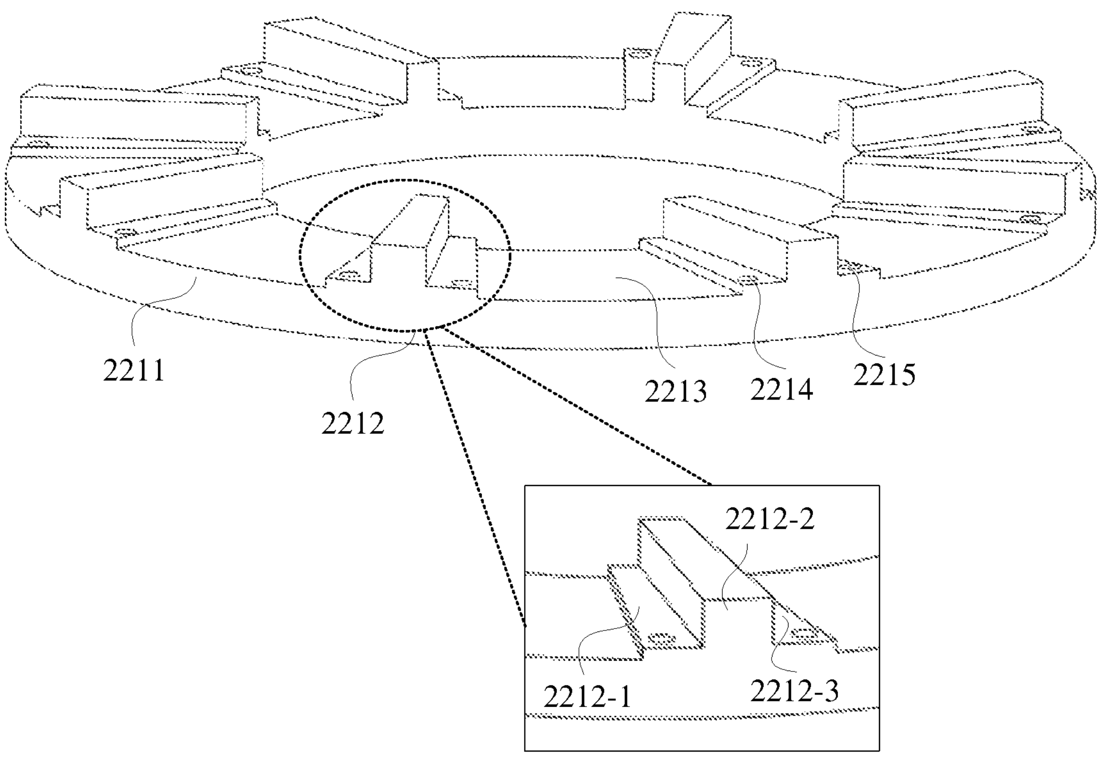
FIG. 4(*a*) is a schematic side view of a structure of a rotor core according to an embodiment of this application.
Figure 4B:
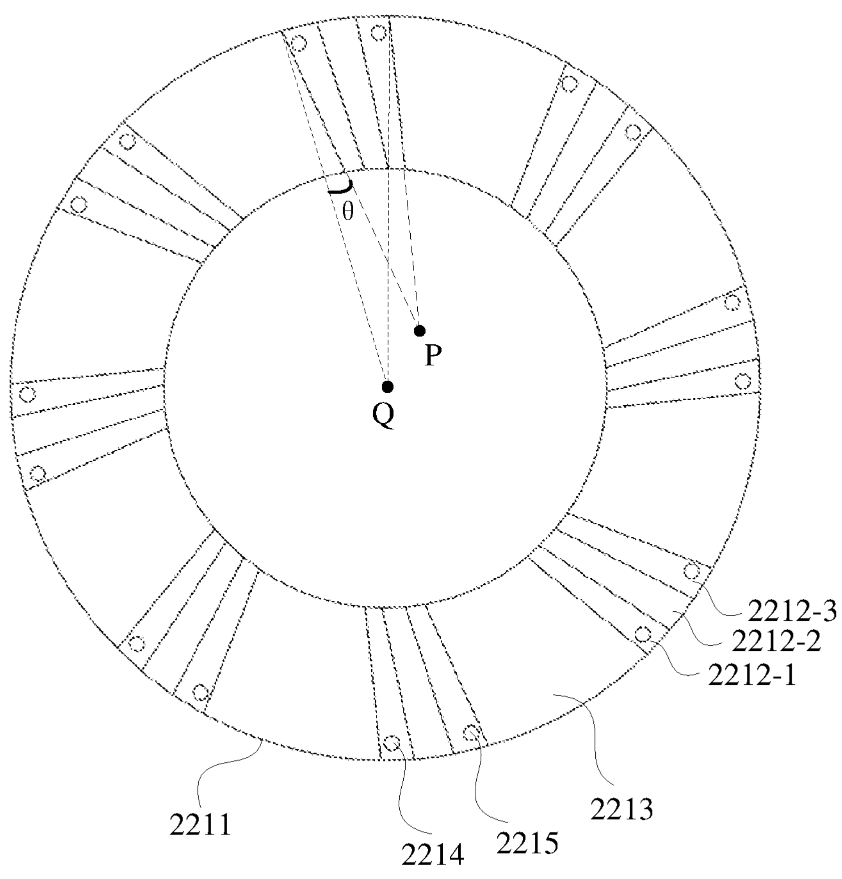

As shown in FIG. 4 (*a*) and FIG. 4 (*b*), the rotor core 221 includes a core yoke 2211 and eight protruding components 2212. The core yoke 2211 has a ring-shaped structure, and the eight protruding components 2212 are disposed at regular intervals on a ring of the core yoke 2211, so that eight grooves 2213 are formed on the ring of the core yoke 2211. In this application, the plurality of protruding components 2212 are disposed on the rotor core 221, so that when magnetic steels 222 are subsequently embedded into the grooves between the protruding components 2212, a saliency ratio is increased, a reluctance torque ratio is increased, and torque density is further increased. In addition, a quantity of magnetic steels for use is reduced.

In a sectional view shown in FIG. 4(*a*), a shape of the protruding component 2212 is an inverted T-shaped structure, and is a sector-shaped structure in a top view shown in FIG. 4(*b*). For example, the protruding components 2212 each include a first component 2212-1, a second component 2212-2, and a third component 2212-3, and the three components are connected and disposed on an upper surface of the core yoke 2211 sequentially. The first component 2212-1 and the third component 2212-3 have different shapes, and heights of the first component 2212-1 and the third component 2212-3 are the same. A shape of the second component 2212-2 is different from shapes of the first component 2212-1 and the third component 2212-3, a height of the second component 2212-2 is further different from the heights of the first component 2212-1 and the third component 2212-3, and the height of the second component 2212-2 is greater than the heights of the first component 2212-1 and the third component 2212-3.

Each of the protruding components 2212 designed in this application may have an irregular sector-shaped structure, to improve sinusoidal property of an air gap flux of the whole rotor 2. For example, as shown in FIG. 4(*b*), an intersection point P of extension lines on two sides of the protruding component 2212 is not a circle center Q of the rotor core 221, and an included angle between a side corresponding to an arc of an outer edge of the protruding component 2212 and an extension line of a side of the protruding component 2212 is $\theta$, where $\theta$ is greater than or equal to 0.

Optionally, an included angle between a side corresponding to an arc of an outer edge of each of the protruding components 2212 and an extension line of a side of the protruding component 2212 is θ, and the following formula is satisfied:

$$\theta \leq \frac{1.5 \times 360^\circ}{6p}, \quad (1)$$

where p is a quantity of magnetic poles of one motor rotor.

Further, with reference to FIG. 4(*a*) and FIG. 4(*b*), a plurality of fastening structures are disposed on each of the protruding components 2212, so that the rotor pressing plate 224 is fastened to the rotor core 221 by using the fastening components 225 subsequently, to reinforce the rotor in an axial direction, thereby improving reliability of the rotor in the axial direction. Optionally, shapes of the fastening structures may be through holes, grooves, protrusions, or other shapes. In an example, a fastening structure 2214 and a fastening structure 2215 are disposed on the first component 2212-1 and the third component 2212-3 respectively, and shapes of the fastening structure 2214 and the fastening structure 2215 are circular through holes. The fastening components 225 may be members such as screws or snaps. This is not limited in this application.

In another example, a circular through hole fastening structure 2214 and a circular through hole fastening structure 2215 are disposed on the first component 2212-1 and the third component 2212-3 respectively, and a circular through hole fastening structure is further disposed at a position, on the core yoke 2211, corresponding to the fastening structure 2214 and the fastening structure 2215, so that the rotor pressing plate 224 and the rotor core 221 are fastened to a core clamping ring 227 by using the fastening components 225 subsequently, to reinforce the rotor in the axial direction, thereby improving reliability of the rotor in the axial direction.

It should be noted that the rotor core 221 in this application is generally manufactured by sheet metal press forming. Therefore, the core yoke 2211 and the eight protruding components 2212 are an integrated structure. In the descriptions of the structure of the rotor core 221 in this application, words such as "connect" and "fasten" are used to facilitate description of a specific structure of the rotor core 221. Clearly, the rotor core 221 may alternatively be formed by splicing one core yoke 2211 and a plurality of protruding components 2212. This is not limited in this application.

In this embodiment of this application, eight protruding components 2212 are shown in FIG. 4(*a*) and FIG. 4(*b*), and a corresponding drive motor is an 8-pole N-slot drive motor (N represents a quantity of stator slots of the stator 1). Clearly, the drive motor used in the technical solution of this application is not limited to an 8-pole N-slot drive motor, and may be a drive motor with any quantity of poles. Therefore, a quantity of the protruding components 2212 is not limited in this application.

With reference to FIG. 2, the motor rotor 22 includes eight magnetic steels 222, and each of the magnetic steels 222 is embedded into a corresponding groove 2213. A shape of the magnetic steels 222 is a sector-shaped structure and matches a shape of the groove 2213. That is, the shape of the magnetic steels 222 is the same as a shape of the grooves formed with the first component 2212-1 and the third component 2212-3 of two adjacent protruding components 2212 and the core yoke 2211, so that the magnetic steel 222 is disposed in the groove subsequently, and the magnetic steel 222 is pressed into the groove 2213 by using the rotor pressing plate 224, to prevent the magnetic steel 222 from shaking from side to side in the groove 2213. Optionally, a thickness of the magnetic steel 222 generally does not exceed the height of the second component 2212-2. Otherwise, the magnetic steel 222 cannot be fastened in the groove on the rotor core 221 by using the rotor pressing plate 224 subsequently.

Figure 5:
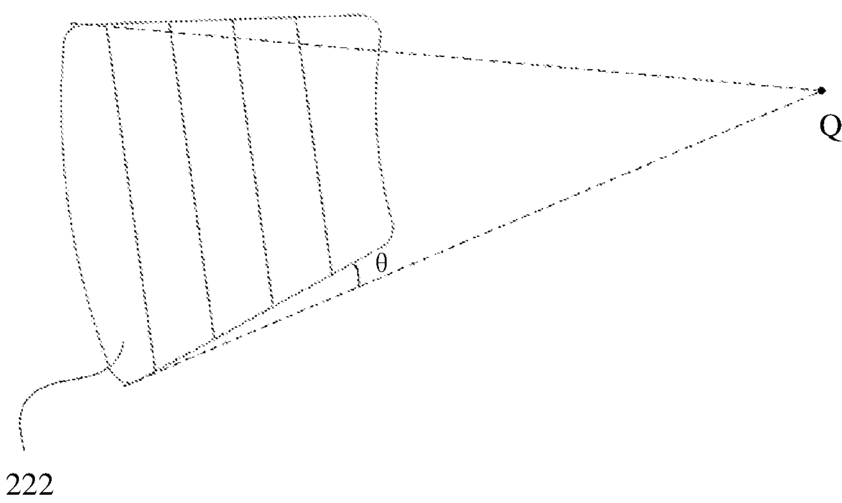
FIG. 5 is a schematic diagram of a structure of a magnetic steel according to an embodiment of this application.

A structure of the magnetic steel 222 may be an integrated structure, or may be a structure formed by splicing a plurality of sub-magnetic steels. For example, as shown in FIG. 5, the magnetic steel 222 is formed by splicing five sub-magnetic steels, and a shape is still a sector-shaped structure. An included angle between a side corresponding to an arc of an outer edge of the sector-shaped structure and an extension line of a side of the sector-shaped structure is also θ. An inner circle radius of the sector is not less than an inner circle radius of the core yoke 2211, and an outer circle radius of the sector is not greater than an outer circle radius of the core yoke 2211.

A magnetizing direction of each of the magnetic steels 222 is axial magnetizing. That is, when the magnetic steels 222 are embedded into the grooves 2213, a direction of a magnetic field is parallel to a normal line of the upper surface of the core yoke 2211. Optionally, if the eight magnetic steels 222 are embedded into the corresponding grooves 2213, and directions of magnetic fields of adjacent magnetic steels 222 are opposite, that is, when an N pole of one of the magnetic steels 222 contacts a surface of the core yoke 2211, and an S pole faces upward, S poles of magnetic steels 222 on two sides of the magnetic steel 222 contact the surface of the core yoke 2211, and N poles face upward.

Further with reference to FIG. 2, the motor rotor 22 includes eight sheets 223, and each of the sheets 223 is embedded into a corresponding groove, and is stacked on each of the magnetic steels 222. A shape of the sheets 223 is a sector-shaped structure and is similar to the shape of the magnetic steels 222. That is, the shape of the sheets 223 is the same as the shape of the grooves formed with the first component 2212-1 and the third component 2212-3 of two adjacent protruding components 2212 and the core yoke 2211, so that the sheet 223 is disposed in the groove subsequently, and the sheet 223 is pressed into the groove 2213 by using the rotor pressing plate 224, to prevent the sheet 223 from shaking from side to side in the groove 2213. Optionally, a sum of thicknesses of the magnetic steel 222 and the sheet 223 is equal to the height of the second component 2212-2, so that when the rotor pressing plate 224 is coupled to the rotor core 221 subsequently, the magnetic steel 222 and the sheet 223 are fastened to the rotor core 221, and an upper surface of the second component 2212-2, an upper surface of the rotor pressing plate 224, and an upper surface of the sheet 223 are on a same horizontal plane after fastening, bringing a better look of an overall structure.

Figure 6:
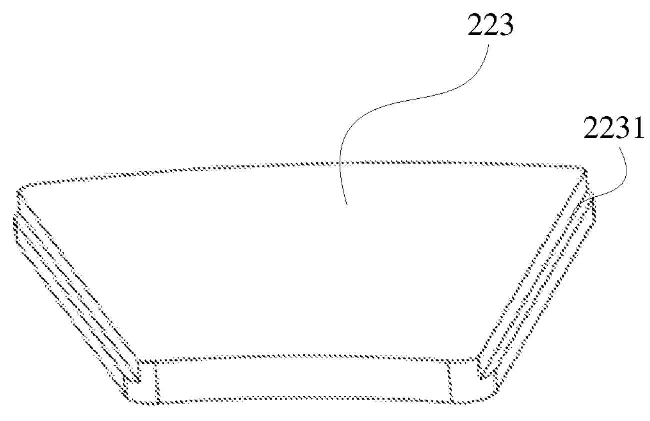
FIG. 6 is a schematic diagram of a structure of a sheet according to an embodiment of this application.

Optionally, for the sheet 223 shown in FIG. 6, groove structures 2231 are provided on two sides of the sector along an axial direction. A shape of the groove structures 2231 is a stepped shape. That is, a rectangular structure is removed from the two sides of the sector of the sheet 223 along the axial direction, so that there is a stepped surface on each of the two sides of the sheet 223, and the stepped surface is parallel to an upper surface of the sheet 233. The groove structures 2231 are provided on the two sides of the sector of the sheet 223, so that when the magnetic steels 222 and the sheets 223 are disposed in the grooves 2213, the rotor pressing plate 224 applies a downward force perpendicular to the upper surface of the core yoke 2211 on the stepped surfaces on the two sides of the sheet 223. In this way, the magnetic steels 222 and the sheets 223 are fastened in a direction perpendicular to the upper surface of the core yoke 2211.

In this embodiment of this application, the sheets 223 may be soft magnetic composite (SMC) sheets, and are generally die-casted by using a high permeability powder. In this application, the sheets 223 are added, so that a Q-axis inductance can be increased to some degree, thereby increasing an effect of a reluctance torque. In addition, there is an effect that an eddy current loss of a motor can be reduced by taking advantage of features of the SMC such as magnetic conductivity and a low high-frequency loss.

Figure 7:
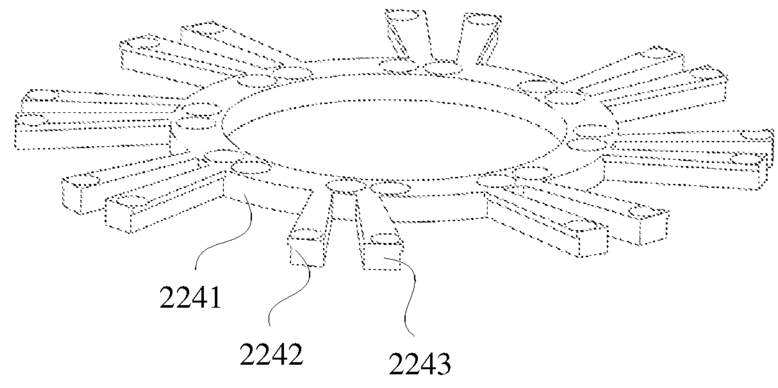
FIG. 7 is a schematic diagram of a structure of a rotor pressing plate according to an embodiment of this application.

As shown in FIG. 7, the rotor pressing plate 224 includes one pressing plate ring 2241, eight first radials 2242, and eight second radials 2243. A shape of the pressing plate ring 2241 is ring-shaped, and an outer circle radius of the ring is less than or equal to the inner circle radius of the core yoke 2211.

Both the first radials 2242 and the second radials 2243 have a sector-shaped structure. One of the first radials and one of the second radials form a group, and are disposed on an outer edge of the pressing plate ring 2241. A distance between each of the first radials 2242 and each of the second radials 2243 is related to the protruding components 2212, and a distance between a group of radials and another group of radials is related to a distance between each of the protruding components on the rotor core 221. To be specific, when the rotor pressing plate 224 is embedded into the rotor core 221, the first radial 2242 and the second radial 2243 in each group are coupled to the first component 2212-1 and the third component 2212-3 on each of the protruding component 2212 respectively.

Optionally, heights of the first radials 2242 and the second radials 2243 are a difference between heights of the first component 2212-1 (and the third component 2212-3) and the second component 2212-2 that are of the protruding component 2212. When the rotor pressing plate 224 is embedded into the rotor core 221, the first radial 2242 is on an upper surface of the first component 2212-1 (or the third component 2212-3), and the second radial 2243 is on an upper surface of the third component 2212-3 (or the first component 2212-1), so that the upper surface of the second component 2212-2, the upper surface of the rotor pressing plate 224, and the upper surface of the sheet 223 are on the same horizontal plane after fastening, bringing a better look of an overall structure.

Figure 8:
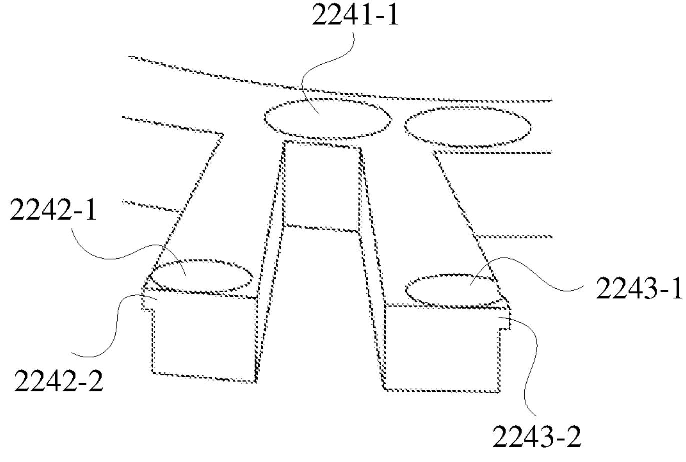
FIG. 8 is a schematic diagram of a partial structure of a rotor pressing plate according to an embodiment of this application.

As shown in FIG. 8, one fastening structure 2242-1 and one fastening structure 2243-1 are disposed on each of the first radials 2242 and each of the second radials 2243 respectively. When the rotor pressing plate 224 is coupled to the rotor core 221, the fastening structure 2242-1 is aligned with the fastening structure 2214 on the first component 2212-1 (or aligned with the fastening structure 2215 on the third component 2212-3). The fastening structure 2243-1 is aligned with the fastening structure 2215 on the third component 2212-3 (or aligned with the fastening structure 2214 on the first component 2212-1). Then, the rotor pressing plate 224 is fastened to the rotor core 221 by using the fastening components 225, to reinforce the rotor in the axial direction, thereby improving reliability of the rotor in the axial direction. Preferably, shapes of the fastening structure 2242-1 and the fastening structure 2243-1 may be through holes, grooves, protrusions, or other shapes.

Optionally, as shown in FIG. 8, for one group including the first radial 2242 and the second radial 2243, a protruding structure 2242-2 is disposed along an axial direction on a side that is of the first radial 2242 and that faces away from the second radial 2243, and a protruding structure 2243-2 is disposed along the axial direction on a side that is of the second radial 2243 and that faces away from the first radial 2242. The protruding structure 2242-2 and the protruding structure 2243-2 have an inverted stepped shape. That is, rectangular structures are removed along the axial direction from sides that are of the first radial 2242 and the second radial 2243 and that face away from each other, so that there is a downward stepped surface on each of the sides that are of the first radial 2242 and the second radial 2243 and that face away from each other. The stepped surfaces are parallel to upper surfaces of the first radial 2242 and the second radial 2243 respectively. When the rotor pressing plate 224 is coupled to the rotor core 221, the protruding structure 2242-2 and the protruding structure 2243-2 are coupled to the groove structures 2231 on the two sides of the sheet 223 respectively, so that the rotor pressing plate 224 applies, with the protruding structure 2242-2 and the protruding structure 2243-2, a force to the groove structures 2231 on the two sides of the sheet 223, and the magnetic steels 222 and the sheets 223 are fastened between the rotor core 221 and the rotor pressing plate 224.

Further, optionally, as shown in FIG. 8, a plurality of fastening structures 2241-1 are disposed on the pressing plate ring 2241, and the plurality of fastening structures 2241-1 are evenly distributed on the pressing plate ring 2241. In this application, the plurality of fastening structures 2241-1 are disposed on the pressing plate ring 2241 to use the plurality of fastening components 225 subsequently for being coupled to fastening structures on a rotor support 226, to fasten the rotor pressing plate 224 to the rotor support 226 and reinforce the rotor in the axial direction, thereby improving reliability of the rotor in the axial direction.

In this embodiment of this application, the eight magnetic steels 222 and the eight sheets 223 are disposed in the eight grooves 2213 on the rotor core 221 respectively, and then the rotor pressing plate 224 is disposed on the rotor core 221, so that the first radials 2242 and the second radials 2243 of the rotor pressing plate 224 are on the first component 2212-1 and the third component 2212-3 respectively. Then, the plurality of fastening components 225 are embedded into the fastening structures on the rotor pressing plate 224 and the rotor core 221, so that the rotor pressing plate 224 is fastened to the rotor core 221, and the magnetic steels 222 and the sheets 223 are fastened to the grooves on the rotor core 221. A structural effect after fastening is shown in FIG. 9.

In this embodiment of this application, the rotor pressing plate 224 is added, and the fastening structures are disposed on the rotor core 221 and the rotor pressing plate 224, to reinforce the magnetic steels 223 in the axial direction, thereby improving reliability of the rotor in the radial direction. A structure of the rotor core is improved, and the plurality of protruding components are disposed on a surface of the rotor core. By improving a structure of the rotor yoke, a magnetic circuit structure is improved, so that a saliency ratio is increased, an electromagnetic reluctance torque is increased, and a torque density is increased. The SMC sheets are added and attached to the magnetic steels, so that a loss of the magnetic steels is reduced, efficiency is improved, and heat of the rotor is reduced.

Figure 9:
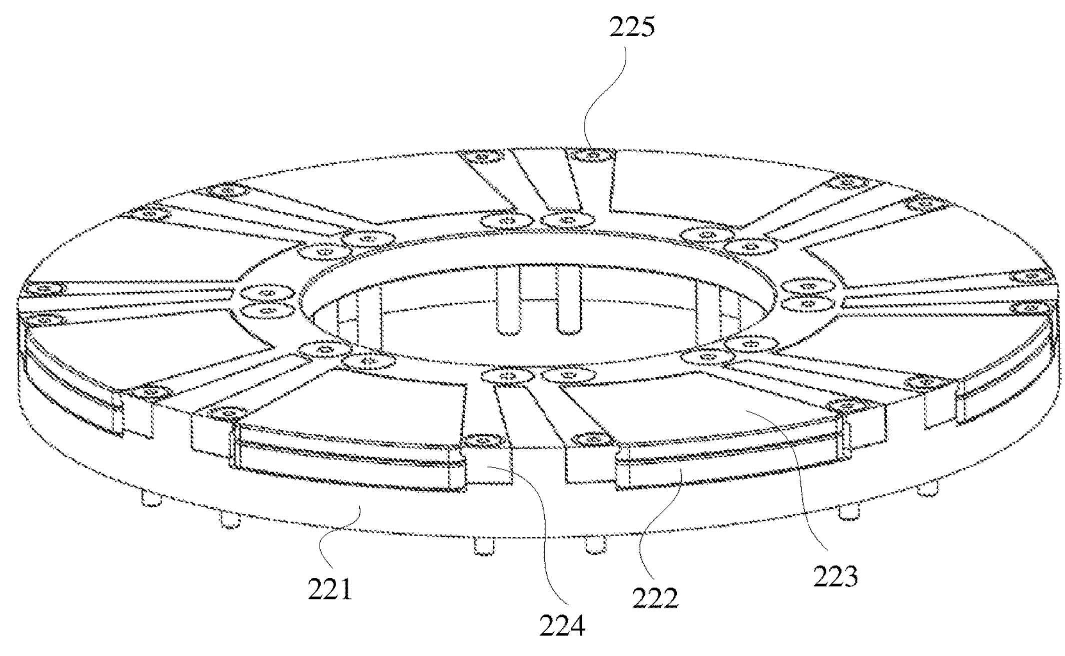
FIG. 9 is a schematic diagram of a structure of a motor rotor including a rotor core, magnetic steels, sheets, and a rotor pressing plate according to an embodiment of this application.

Further with reference to FIG. 9, in this structure, the magnetic steels 222 and the sheets 223 that are fastened to the rotor pressing plate 224 and the rotor core 221 are not fastened on inner sides and outer sides of the magnetic steels 222 and the sheets 223. When the structure is nested on the rotating shaft 21 and rotates with the rotating shaft 21, a centripetal force and a centrifugal force are generated. The magnetic steels 222 and the sheets 223 move, easily along the axial direction, towards a circle center of the rotor core 221 or away from the circle center of the rotor core 221.

Therefore, in this application, the motor rotor 22 further includes the rotor support 226. The rotor support 226 is fastened to the rotor core 221, and forms eight enclosed cavities with the rotor core 221 and the rotor pressing plate 224, so that the magnetic steels 222 and the sheets 223 are in the enclosed cavities, and it is ensured that the magnetic steels 222 and the sheets 223 do not rotate with the rotor 2 along the axial direction and move towards the circle center of the rotor core 221 or away from the circle center of the rotor core 221.

Figure 10:
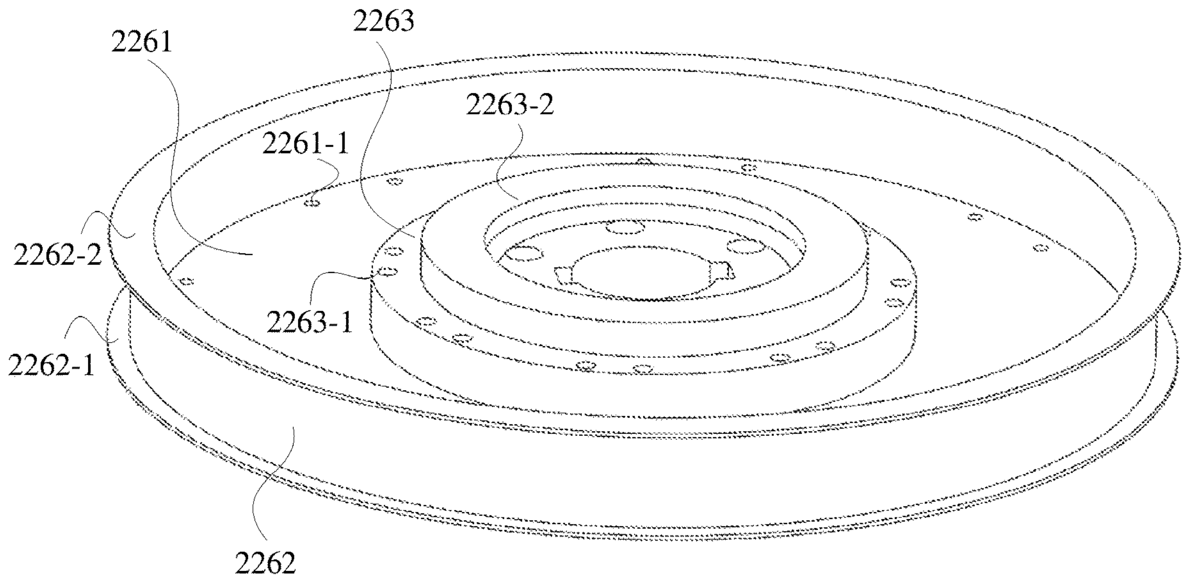
FIG. 10 is a schematic diagram of a structure of a rotor support according to an embodiment of this application.

For example, as shown in FIG. 10, the rotor support 226 includes a support backing plate 2261, a support outer ring 2262, and a support inner ring 2263. The support backing plate 2261 has a disk-shaped structure, and there is one through hole in the middle of the disk-shaped structure. A radius of the through hole is equal to a radius of the rotating shaft 21, so that the rotor support 226 can be nested on the rotating shaft 21.

A plurality of fastening structures 2261-1 are disposed on the support backing plate 2261, and a position of each of the fastening structures 2261-1 on the support backing plate 2261 matches a position of each of the fastening structures on the rotor core 221. The structure shown in FIG. 9 is disposed on the support backing plate 2261, and each of the fastening structures on the rotor core 221 is aligned with each of the fastening structures 2261-1 on the support backing plate 2261, to fasten the rotor core 221 and the rotor pressing plate 224 to the support backing plate 2261 by using the fastening components 225 and reinforce the rotor in the axial direction, thereby improving reliability of the rotor in the axial direction.

The support outer ring 2262 is disposed on an outer edge of the support backing plate 2261, and an inner circle radius of the support outer ring is equal to the outer circle radius of the core yoke 2211 of the rotor core 221, so that the structure shown in FIG. 9 can be embedded into the rotor support 226 to provide a function of a baffle plate for outer sides of the magnetic steels 222 and the sheets 223, to prevent the magnetic steels 222 and the sheets 223 from rotating with the rotor 2 and moving, in the axial direction, away from the circle center of the rotor core 221 with a centrifugal force, thereby reinforcing the rotor in a radial direction and improving reliability of the rotor in the radial direction.

A first rib 2262-1 and a second rib 2262-2 are provided on an upper end and a lower end of the support outer ring 2262 respectively, where an extension direction of the two ribs is away from a circle center of the support outer ring 2262; and are configured to be coupled to a sheath 228 sleeved on the support outer ring 2262 subsequently to provide upper and lower baffle plates for the sheath, to prevent the sheath 228 from falling off from the support outer ring 2262.

The support inner ring 2263 is disposed at the center of the support backing plate 2261, and an outer circle radius of the support inner ring is equal to the inner circle radius of the core yoke 2211 of the rotor core 221, so that the structure shown in FIG. 9 can be embedded into the rotor support 226 to provide a function of a baffle plate for the outer sides of the magnetic steels 222 and the sheets 223, to prevent the magnetic steels 222 and the sheets 223 from rotating with the rotor 2 and moving, in the axial direction, towards the circle center of the rotor core 221 with a centripetal force, thereby reinforcing the rotor in the radial direction and improving reliability of the rotor in the radial direction.

A plurality of fastening structures 2263-1 are disposed on an upper surface of the support inner ring 2263, and a position of each of the fastening structures 2263-1 on the support inner ring 2263 matches a position of each of the fastening structures 2241-1 on the pressing plate ring 2241 of the rotor pressing plate 224. The structure shown in FIG. 9 is disposed on the support backing plate 2261, and each of the fastening structures 2241-1 and fastening structures 2241-2 on the pressing plate ring 2241 of the rotor pressing plate 224 is aligned with each of the fastening structures 2263-1 on the support inner ring 2263, to fasten the rotor pressing plate 224 to the support backing plate 2261 by using the fastening components 225.

A fastening ring 2263-2 is disposed on the upper surface of the support inner ring 2263. An outer circle radius of the fastening ring 2263-2 is equal to an inner circle radius of the pressing plate ring 2241 of the rotor pressing plate 224, and heights of the support inner ring 2263 and the fastening ring 2263-2 (lengths in a normal direction of the upper surface of the support backing plate 2261) are the same as a height of the rotor core 221. When the structure shown in FIG. 9 is disposed on the support backing plate 2261, the fastening ring 2263-2 is coupled to the pressing plate ring 2241 of the rotor pressing plate 224, to prevent the pressing plate ring 2241 from collapsing towards the support backing plate 2261.

In this application, the motor rotor 22 further includes a core clamping ring 227. The core clamping ring 227 is generally a ring-shaped structure made of a high-strength light metal. An inner circle radius of the core clamping ring 227 is equal to an outer circle radius of the support inner ring 2263 of the rotor support 226, and an outer circle radius of the core clamping ring 227 is equal to an inner circle radius of the rotor core 221. When the structure shown in FIG. 9 is embedded into the rotor support 226, the core clamping ring 227 may be embedded into a gap between the structure shown in FIG. 9 and the rotor support 226, so that the two are coupled with no gap.

Figure 11:
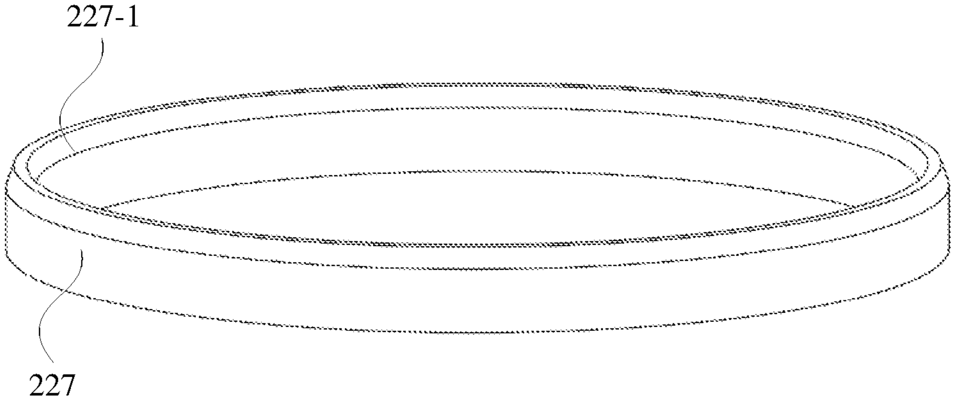
FIG. 11 is a schematic diagram of a structure of a rotor clamping ring according to an embodiment of this application.

Optionally, as shown in FIG. 11, a chamfer 227-1 is provided at one end of the core clamping ring 227, and an extension direction of the chamfer 227-1 is towards a circle center of the core clamping ring 227. After the core clamping ring 227 is embedded into the gap between the structure shown in FIG. 9 and the rotor support 226, the core clamping ring 227 may be removed from the gap through the chamfer 227-1.

Figure 12:
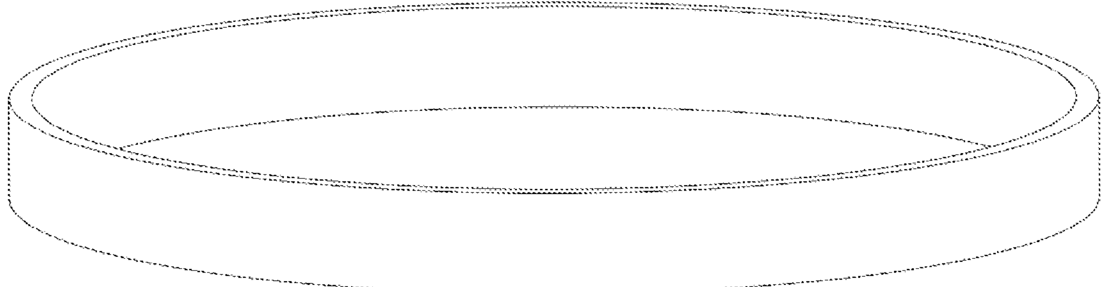
FIG. 12 is a schematic diagram of a structure of a rotor clamping ring according to an embodiment of this application.

In this application, the motor rotor 22 further includes the sheath 228. As shown in FIG. 12, the sheath 228 is generally a ring-shaped structure made of a carbon fiber, and is sleeved on an outer side of the support outer ring 2262, to improve a strength of the rotor 2 in the radial direction with a high-speed centrifugal force and further reinforce the rotor in the radial direction, thereby improving reliability of the rotor in the radial direction.

In embodiments of this application, in the protected motor rotor, the plurality of fastening structures are disposed on the components such as the rotor core, the rotor pressing plate, and the rotor support, and then the components are fastened to each other by using fastening components such as screws and snaps, to improve reliability of the rotor in the axial direction. Both inner and outer sides of the rotor core are fastened by adding the support inner ring and the support outer ring of the rotor support. In addition, the fiber sheath is added for reinforcement, to ensure reliability of the rotor in the radial direction at a high rotation speed. A structure of the rotor yoke is improved, and the plurality of fastening components are disposed on a surface of the rotor yoke, to improve a magnetic circuit structure, so that a saliency ratio is increased, an electromagnetic reluctance torque is increased, and a torque density is increased. The SMC sheets are added and attached to the magnetic steels, so that a loss of the magnetic steels is reduced, efficiency is improved, and heat of the rotor is reduced.

In the technical solution of this application described above, an 8-pole N-slot axial flux permanent magnet machine is used as an example. Clearly, the solution under protection in this application is not limited to the 8-pole N-slot axial flux permanent magnet machine, and may be a drive motor with any quantity of poles. This is not limited in this application.

An embodiment of this application further provides an electric vehicle, including at least one drive motor. The drive motor may be the drive motor described in FIG. 1 to FIG. 12 and corresponding content. Because the electric vehicle includes the drive motor, the electric vehicle has all or at least some of advantages of the drive motor.

In the descriptions of this specification, specific features, structures, materials, or characteristics may be combined in a proper manner in any one or more of embodiments or examples.

At last, it should be noted that the embodiments described above are merely intended for describing the technical solution of this application, but not for limiting this application. Although this application is described in detail with reference to the foregoing embodiments, a person of ordinary skill in the art should understand that modifications can still be made to the technical solution described in the foregoing embodiments or equivalent replacements can still be made to some technical features thereof, without departing from the spirit and scope of the technical solution of embodiments of this application.

What is claimed is:

1. A motor rotor comprising:

one rotor core, wherein the rotor core comprises one rotor yoke and at least two protruding components, and the at least two protruding components are disposed on a first surface of the rotor yoke;

at least two grooves, wherein each groove is formed with two adjacent protruding components and the first surface of the rotor yoke;

at least two magnetic steels that are separately disposed in the at least two grooves, wherein a quantity of the at least two magnetic steels is the same as a quantity of the at least two grooves; and one rotor pressing plate that is coupled to the at least two protruding components for fastening the at least two magnetic steels in the at least two grooves, wherein the one rotor pressing plate comprises one pressing plate ring, at least two first radials, and at least two second radials, wherein the at least two first radials and the at least two second radials are disposed between each other, and one end of each of the at least two first radials and one end of each of the at least two second radials are fastened to the pressing plate ring, wherein the at least two protruding components comprise a first component, a second component, and a third component, wherein heights of the first component and the third component are the same, and heights of the first component and the second component are different, wherein each height is a length along a normal direction of the first surface of the rotor yoke, wherein the first component, the second component, and the third component are sequentially connected and disposed on the first surface of the rotor yoke, wherein a quantity of the at least two first radials is the same as a quantity of the at least two second radials, and is the same as a quantity of the protruding components, and wherein a distance between a first radial and a second radial that are adjacent is equal to a distance between the first component and the third component.

2. The motor rotor according to claim 1, further comprising:

at least two sheets that are separately disposed in the at least two grooves, wherein one of the sheets is stacked on one of the magnetic steels, and a quantity of the at least two sheets is the same as the quantity of the at least two magnetic steels, wherein the rotor pressing plate is further configured to fasten the at least two magnetic steels and the at least two sheets in the at least two grooves.

3. The motor rotor according to claim 2, wherein a shape of one of the at least two sheets is the same as a shape of one of the at least two grooves.

4. The motor rotor according to claim 2, wherein the at least two sheets are made of a soft magnetic composite material.

5. The motor rotor according to claim 1, wherein the at least two protruding components are disposed on the first surface of the rotor yoke at regular intervals along a circumferential direction.

6. The motor rotor according to claim 1, wherein a shape of one of the at least two magnetic steels is the same as a shape of one of the at least two grooves.

7. The motor rotor according to claim 1, wherein heights of the at least two first radials and the at least two second radials are the same, and are equal to a difference between the heights of the first component and the second component.

8. The motor rotor according to claim 1, wherein the first component and the third component each comprise at least one first fastening structure, and each of the at least two first radials and the at least two second radials comprise at least one second fastening structure, wherein at least two second fastening structures are coupled to at least two first fastening structures in a one-to-one correspondence, to fasten the rotor pressing plate to the rotor core.

9. The motor rotor according to claim 1, further comprising a rotor support, wherein the rotor support comprises a support backing plate, a support outer ring, and a support inner ring, the support outer ring is disposed on an outer edge of the support backing plate, and the support inner ring is disposed at a central position of the support backing plate; and the rotor core is disposed in grooves between the support backing plate, the support outer ring, and the support inner ring.

10. The motor rotor according to claim 9, wherein the support backing plate comprises at least two third fastening structures, and at least two first fastening structures are coupled to the at least two third fastening structures in a one-to-one correspondence, to fasten the rotor core to the rotor support.

11. The motor rotor according to claim 9, wherein the rotor pressing plate comprises one pressing plate ring, the pressing plate ring comprises at least two fourth fastening structures, and the support inner ring comprises at least two fifth fastening structures, wherein the at least two fourth fastening structures are coupled to the at least two fifth fastening structures in a one-to-one correspondence, to fasten the rotor pressing plate to the rotor support.

12. The motor rotor according to claim 9, further comprising: a sheath that is disposed on an outer edge of the rotor support.

13. The motor rotor according to claim 1, further comprising: a core clamping ring that is disposed on an inner edge of a central through hole of the rotor yoke.

14. A drive motor, comprising at least one stator and a plurality of motor rotors, wherein every two of the motor rotors are disposed on two sides of one stator planar symmetrically, wherein each motor rotor comprises:

one rotor core, wherein the rotor core comprises one rotor yoke and at least two protruding components, and the at least two protruding components are disposed on a first surface of the rotor yoke;

at least two grooves, wherein each groove is formed with two adjacent protruding components and the first surface of the rotor yoke;

at least two magnetic steels that are separately disposed in the at least two grooves, wherein a quantity of the at least two magnetic steels is the same as a quantity of the at least two grooves; and one rotor pressing plate that is coupled to the at least two protruding components for fastening the at least two magnetic steels in the at least two grooves, wherein the one rotor pressing plate comprises one pressing plate ring, at least two first radials, and at least two second radials, wherein the at least two first radials and the at least two second radials are disposed between each other, and one end of each of the at least two first radials and one end of each of the at least two second radials are fastened to the pressing plate ring, wherein the at least two protruding components comprise a first component, a second component, and a third component, wherein heights of the first component and the third component are the same, and heights of the first component and the second component are different, wherein each height is a length along a normal direction of the first surface of the rotor yoke, wherein the first component, the second component, and the third component are sequentially connected and disposed on the first surface of the rotor yoke, wherein a quantity of the at least two first radials is the same as a quantity of the at least two second radials, and is the same as a quantity of the protruding components, and wherein a distance between a first radial and a second radial that are adjacent is equal to a distance between the first component and the third component.

15. The drive motor according to claim 14, wherein the motor rotor further comprises:

at least two sheets that are separately disposed in the at least two grooves, wherein one of the sheets is stacked on one of the magnetic steels, and a quantity of the at least two sheets is the same as the quantity of the at least two magnetic steels, wherein the rotor pressing plate is further configured to fasten the at least two magnetic steels and the at least two sheets in the at least two grooves.

16. The drive motor according to claim 15, wherein the at least two sheets are made of a soft magnetic composite material.

17. The drive motor according to claim 14, wherein the at least two protruding components are disposed on the first surface of the rotor yoke at regular intervals along a circumferential direction.

18. The drive motor according to claim 14, wherein a shape of one of the at least two magnetic steels is the same as a shape of one of the at least two grooves.

19. The drive motor according to claim 14, further comprising: a core clamping ring that is disposed on an inner edge of a central through hole of the rotor yoke.

20. An electric vehicle, comprising at least one drive motor, wherein the at least one drive motor comprises at least one stator and a plurality of motor rotors, wherein every two of the motor rotors are disposed on two sides of one stator planar symmetrically, wherein each motor rotor comprises:

one rotor core, wherein the rotor core comprises one rotor yoke and at least two protruding components, and the at least two protruding components are disposed on a first surface of the rotor yoke;

at least two grooves, wherein each groove is formed with two adjacent protruding components and the first surface of the rotor yoke;

at least two magnetic steels that are separately disposed in the at least two grooves, wherein a quantity of the at least two magnetic steels is the same as a quantity of the at least two grooves; and one rotor pressing plate that is coupled to the at least two protruding components for fastening the at least two magnetic steels in the at least two grooves, wherein the one rotor pressing plate comprises one pressing plate ring, at least two first radials, and at least two second radials, wherein the at least two first radials and the at least two second radials are disposed between each other, and one end of each of the at least two first radials and one end of each of the at least two second radials are fastened to the pressing plate ring, wherein the at least two protruding components comprise a first component, a second component, and a third component, wherein heights of the first component and the third component are the same, and heights of the first component and the second component are different, wherein each height is a length along a normal direction of the first surface of the rotor yoke, wherein the first component, the second component, and the third component are sequentially connected and disposed on the first surface of the rotor yoke, wherein a quantity of the at least two first radials is the same as a quantity of the at least two second radials, and is the same as a quantity of the protruding components, and wherein a distance between a first radial and a second radial that are adjacent is equal to a distance between the first component and the third component.

* * * * *